United States Patent Office 3,231,534
Patented Jan. 25, 1966

3,231,534
FREEZE-THAW STABLE VINYL ESTER POLYMER EMULSIONS CONTAINING A SMALL AMOUNT OF COPOLYMERIZED HYDROPHILIC MONOMER AND THE PREPARATION THEREOF
Charles E. Blades, Berkeley Heights, and Alio J. Buselli, Livingston, N.J., assignors, by mesne assignments, to Cumberland Chemical Corporation, New York, N.Y., a corporation of Delaware
No Drawing. Filed Nov. 7, 1960, Ser. No. 67,487
9 Claims. (Cl. 260—29.6)

This invention relates to a novel method of preparing freeze-thaw stable aqueous emulsions of vinyl ester polymers. The method of this invention more particularly involves the polymerization of a vinyl ester monomer, or mixture of monomers, together with a small amount of an unsaturated polymerizable monomer containing functional hydrophilic groups and correlating the polymerization of the vinyl ester monomer and the monomer containing the hydrophilic groups so as to incorporate the hydrophilic groups into the vinyl ester polymer so that they are substantially evenly distributed throughout substantially the entire range of conversion of the vinyl ester. The invention also includes novel freeze-thaw stable vinyl ester polymer emulsions produced according to this invention.

The emulsions produced according to this invention are useful as coating compositions for the application of protective coatings to various surfaces, such as glass, wood, and metal and also in the formulation of emulsion paints embodying pigments and other additives as is well understood in the art.

A freeze-thaw stable emulsion is one which can be frozen and thawed without any significant changes taking place in the physical properties of the emulsion and which can still be used for its intended purpose after being subjected to freeze-thaw cycles.

An emulsion which is not freeze-thaw stable undergoes changes in its physical properties after being subjected to freeze-thaw cycles which generally render the emulsion useless for its intended purpose. Freeze-thaw unstable emulsions are generally discarded once they have been frozen.

The effect of freezing on the physical properties of freeze-thaw unstable emulsions varies from emulsion to emulsion depending upon the particular polymer emulsified, the solids content thereof, and the various constituents of the emulsion such as anti-freezes, plasticizers, emulsifying agents, protective colloids, and the like. Generally, however, when a freeze-thaw unstable emulsion is frozen, the aqueous phase forms a continuous ice phase. The expansion resulting from the formation of the solid ice phase forces the polymer particles together in a generally irreversible manner. Upon thawing, the particles are precipitated or remain coagulated, and generally cannot be redispersed in the aqueous phase. This precipitation or coagulation of the polymer particles renders them useless for the practical purposes for which they were intended.

Although freeze-thaw stability of emulsions is not essential to their use, such stability is of definite advantage in their storage and shipment during cold weather eliminating the necessity for the use of heat in storage and during shipment.

Prior vinyl ester polymer emulsions are generally not freeze-thaw stable, and it is the object of this invention to produce vinyl ester polymer emulsions which are freeze-thaw stable and which can be subjected to repeated freeze-thaw cycles without resulting in any significant changes in their physical properties and which can subsequently be used for their intended purpose.

Freeze-thaw stable vinyl ester polymer emulsions are prepared according to this invention by copolymerizing vinyl ester monomers and an unsaturated polymerizable monomer containing functional hydrophilic groups under controlled conditions so as to introduce the hydrophilic groups into the resulting vinyl ester polymer at substantially evenly distributed intervals throughout substantially the entire range of conversion of the vinyl ester monomer.

Various vinyl ester monomers or mixtures thereof can be polymerized and rendered freeze-thaw stable according to this invention. The vinyl ester monomers which are preferred according to the present invention are those vinyl esters which are prepared from aliphatic carboxylic acids having from about 1 to about 20 carbon atoms. Examples of specific vinyl esters include vinyl acetate, vinyl propionate, vinyl butyrate, vinyl 2-ethylhexoate, vinyl stearate, vinyl crotonate, vinyl pelargonate, vinyl formate, and the like. Copolymers can also be formed using two different vinyl esters. Some examples of copolymers include vinyl acetate-vinyl stearate in which the weight ratio of one monomer to the other may vary from 5–95%, and preferably the vinyl ester of the higher fatty acid represents from 10–30% by weight of the copolymer. Vinyl esters can also be copolymerized with a dialkyl ester of an alpha, beta-unsaturated dicarboxylic acid, such as dialkyl maleates, dialkyl fumarates and the like, e.g., dibutyl maleate and dibutyl fumarate. In such copolymers the dialkyl ester of the unsaturated dicarboxylic acid can represent from 5–40% by weight of the copolymer and advantageously from 10–30% by weight. Other examples of polymers which can be formed from two or more different vinyl esters include vinyl acetate-vinyl crotonates, vinyl acetate-divinyl azelate, vinyl acetate-vinyl stearate-dibutyl maleate, vinyl acetate-vinyl stearate-dioctyl maleate, vinyl acetate-alkyl acrylate copolymers such as vinyl acetate-ethyl acrylate, and the like.

Various mono-ethylenically unsaturated polymerizable monomers containing functional hydrophilic groups can be copolymerized with the vinyl ester monomers according to this invention including mono-ethylenically unsaturated polymerizable mono- and di-carboxylic acids, preferably containing from about 3 to about 10 carbon atoms, such as crotonic acid, acrylic acid, methacrylic acid, monobutyl maleate, itaconic acid, fumaric acid, maleic acid, and the like; and the various acid amides of the above carboxylic acids such as acrylamide, crotonamide, methacrylamide, and the like. Further examples of mono-ethylenically unsaturated polymerizable monomers containing functional hydrophilic groups include cyclic amides such as vinyl pyrrolidone and rosin acids. Other various unsaturated polymerizable monomers containing functional hydrophilic groups can also be used as will be apparent to those skilled in the art.

The process by which the mono-ethylenically unsaturated polymerizable monomers containing functional hydrophilic groups can be substantially evenly distributed throughout substantially the entire range of conversion of the vinyl ester polymers is variable depending mainly upon the particular vinyl ester monomers or comonomers being polymerized and also upon the particular monomer containing functional hydrophilic groups being polymerized therewith.

Vinyl ester monomer systems or mixtures thereof in themselves polymerize at variable rates under otherwise identical conditions. For example, the polymerization of vinyl acetate proceeds quite rapidly while the copolymerization of vinyl acetate-dibutyl maleate proceeds at a slower rate under the same conditions. Unsaturated polymerizable monomers containing hydrophilic groups also polymerize at variable rates under otherwise identical conditions. For example, the copolymerization in bulk of acrylic acid and vinyl acetate proceeds quite rapidly while the copolymerization of crotonic acid and vinyl acetate proceeds at a slower rate under the same conditions.

In order to incorporate the monomer containing the hydrophilic groups into the vinyl ester polymer in the manner described herein, it is thus important to correlate or adjust the polymerization rate of the particular vinyl ester monomer being polymerized and the particular monomer containing the hydrophilic groups.

The individual polymerization rates of the vinyl ester monomers and the monomers containing the hydrophilic groups gives an indication as to how the reaction should be carried out, in order to substantially evenly distribute the hydrophilic groups throughout the range of conversion of the vinyl ester monomer. Where the polymerization rate of the particular vinyl ester monomer being polymerized is substantially the same as the polymerization rate of the particular monomer containing the hydrophilic groups, the monomer can generally be polymerized by a batch process and it will not be necessary to delay the addition of either monomer. In such an instance the particular vinyl ester monomer can be placed in the reaction kettle together with the monomer containing the hydrophilic groups and the other necessary constituents for the emulsion polymerization and the reaction carried out directly. An example of a system which can be prepared in a batch process and which will result in a substantially even distribution of the hydrophilic groups throughout the range of conversion of the vinyl ester is a vinyl acetate-dibutyl maleate-crotonic acid system. Other systems which can be carried out in a batch process are set forth in the specific examples.

If the reactivity of the monomer containing the hydrophilic groups is significantly faster than that of the vinyl ester monomer with which it is to be copolymerized, the freeze-thaw stable emulsions of this invention can be prepared by delaying the addition of the monomer containing the hydrophilic groups. This delayed addition technique can generally be carried out by first placing the vinyl ester monomer together with the water and emulsifying agents in the reaction kettle and initiating the reaction without the presence of the monomer containing the hydrophilic groups. After the reaction of the vinyl ester monomer has begun, the gradual addition of the monomer containing the hydrophilic groups can be started and continued over at least a significant portion of the remaining reaction.

In some instances where the reactivity of the vinyl ester monomer is significantly faster than that of the monomer containing the hydrophilic groups it may be advantageous to first initiate the reaction of the monomer containing the hydrophilic groups under emulsion polymerization conditions and gradually add the vinyl ester monomer to the reaction mixture.

If the polymerization rate of a particular vinyl ester monomer proceeds rather slowly at the beginning of the reaction but speeds up near the end of the reaction, it may also be desirable to add the hydrophilic monomer slowly during the first part of the reaction and increase the rate addition near the end of the reaction.

We have found, however, that when it becomes necessary to delay the addition of one of the monomers, it is advantageous to gradually add the delayed addition monomer at a fairly even rate over the entire reaction time.

In the polymerization of mixtures of two or more vinyl ester monomers, it is advantageous at times to delay the addition of part of the vinyl ester monomers to the reaction mixture such as is illustrated in some of the specific examples. This method of polymerization of the vinyl ester monomers generally results in a polymer of smaller particle size.

In correlating the polymerization, it must also be borne in mind that although a particular vinyl ester monomer may by itself polymerize at a rate substantially slower or faster than a particular monomer containing the hydrophilic groups by itself, and which would ordinarily indicate that a delayed addition technique should be used in order to substantially evenly distribute the hydrophilic groups throughout the range of conversion of the vinyl ester monomer, the combined or copolymerization thereof may inhibit or otherwise affect the individual polymerization rates of the reactants sufficiently to require a different polymerization process. For example, the polymerization rate of methacrylic acid is inhibited or reduced when copolymerized with vinyl acetate-dibutyl maleate and such a system can be polymerized according to this invention by a batch process where otherwise the delayed addition of the methacrylic acid to this particular copolymer system would be indicated. Acrylic acid, however, when copolymerized with vinyl acetate-dibutyl maleate is not significantly inhibited thereby.

Numerous examples of the manner of incorporating the hydrophilic groups into various vinyl ester polymers and copolymers in order to impart freeze-thaw stability thereto are set forth in the specific examples below. The most advantageous manner of copolymerizing the monomers can readily be accomplished by those skilled in the art by routine experimentation bearing in mind the teachings and disclosures contained herein.

The amount of monomer containing functional hydrophilic groups which should be employed for a specific vinyl ester polymer emulsion will depend upon the nature of the vinyl ester monomer, or monomers, the nature of monomer containing the functional hydrophilic groups and the properties desired for the final polymeric emulsion. It has been found, however, that the amount of the monomer containing functional hydrophilic groups employed to form the freeze-thaw stable polymer emulsions of this invention should be from about 0.1% to about 2% based on the total weight of monomers.

As an example, we have found that a preferred freeze-thaw stable vinyl acetate dibutyl maleate copolymer emulsion can be formed using as little as 0.2 percent crotonic acid based on the total weight of the monomers present, and that about 0.6 percent concentration of crotonic acid in a alkaline medium is advantageous.

The optimum amount of the monomers containing the hydrophilic groups which can be used can be determined by those skilled in the art by routine experimentation bearing in mind the properties desired in the resulting polymer emulsions and films formed therefrom.

The amount of monomer containing hydrophilic groups which can be used to form the freeze-thaw vinyl ester polymer emulsions in practice involves striking a balance between the water sensitivity of the films formed from the polymer emulsions and the extent of the freeze-thaw stability of the polymer emulsions themselves. Generally as the concentrations of the monomers containing the hydrophilic groups are decreased, the vinyl ester polymer emulsions become more unstable when subjected to the freeze-thaw cycles. When the amounts or concentrations of the monomers containing the hydrophilic groups are increased, the vinyl ester polymer emulsions form films which become increasingly sensitive to water.

We have further found that when using low concentrations of monomers containing hydroxyl groups such that the degree of freeze-thaw stability of the monomer emulsions is decreased, that the freeze-thaw stability of these emulsions can be significantly improved by rendering the resulting emulsions alkaline. For example, a vinyl acetate-dibutyl maleate copolymer emulsion containing about 0.2 to 0.6 percent crotonic acid based on the total weight of the original monomers present and which is substantially evenly distributed throughout the entire range of conversion of the vinyl acetate-dibutyl maleate copolymer, the resulting emulsion does not have satisfactory freeze-thaw stability properties. If this particular vinyl ester polymer emulsion is rendered alkaline, however, its freeze-thaw stability is significantly improved and it can be subjected to repeated freeze-thaw cycles without any significant changes in its physical properties. In this manner it is possible to retain the excellent water and scrub resistant properties of films formed from the vinyl acetate-dibutyl maleate copolymer emulsions and yet obtain excellent freeze-thaw stability of the emulsion itself.

The vinyl ester polymer emulsions of this invention can be neutralized or rendered alkaline with various alkaline agents including ammonium bicarbonate, sodium carbonate, trisodium phosphate, and the like. The specific agents listed above are also advantageous in that they provide a source for a buffering system as well as a means for rendering the emulsion alkaline. The exact alkaline pH at which the best balance between the freeze-thaw stability of the emulsion and the water resistant properties of films formed therefrom will vary from emulsion to emulsion but can readily be determined by routine experimentation.

We have further found that the pH values of the alkaline vinyl ester emulsions formed according to this invention can be stabilized and pH drift prevented by continuing the polymerization reaction until the residual monomer content is below about 0.2 percent.

The emulsion polymerization can be carried out according to this invention in various manners including those known in the prior art. We have found that it is advantageous to use the polymerization process described in the copending U.S. patent application Serial No. 583,623, filed May 9, 1956, which is assigned to the same assignee as the present application.

The process described in this copending application generally involves the formation of a vinyl ester monomer aqueous emulsion containing a mixture of at least two non-ionic emulsifying agents consisting of at least one relatively hydrophilic non-ionic emulsifying agent and at least one relatively hydrophobic non-ionic emulsifying agent. The vinyl ester monomer emulsion is then homogenized to reduce substantially all of the monomers present to a droplet size below about 10 microns. The homogenized monomer emulsion is then polymerized with the addition of a catalyst while being moderately agitated.

Various emulsifying agents can be used to prepare the freeze-thaw vinyl ester polymer emulsions of this invention as will be understood by those skilled in the art. Although various anionic and cationic emulsifying agents can be used, we have found that it is advantageous to use non-ionic emulsifying agents.

Non-ionic emulsifying agents which can be used include polyoxyethylene condensates. Polyoxyethylene condensates may be represented by the general formula:

where R is the residue of a fatty alcohol containing 10–18 carbon atoms, an alkyl phenol, a fatty acid containing 10–18 carbon atoms, an amide, an amine, or a mercaptan, and where $n$ is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether, and the like; polyoxyethylene alkaryl ethers such as polyoxyethylene nonylphenyl ether, polyoxyethylene octylphenyl ether, and the like; polyoxyethylene esters of higher fatty acids such as polyoxyethylene laurate, polyoxyethlene oleate, and the like, as well as condensates of ethylene oxide with resin acids and tall oil acids; polyoxyethylene amide and amine condensates such as N-polyoxyethylene laur-amide, and N-lauryl-N-polyoxyethylene amine, and the like; and polyoxyethylene thio-ethers such as polyoxyethylene t-dodecyl thio-ether.

The non-ionic emulsifying agents which can be used according to this invention also include a series of surface active agents known as Pluronics and marketed by Wyandotte. The Pluronics have the general formula:

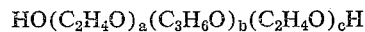

where $a$, $b$, and $c$ are integers of 1 or above. As $b$ increases, the compounds become less water soluble or more oil soluble and thus more hydrophobic when $a$ and $c$ remain substantially constant.

We have also found that it is advantageous to use combinations of non-ionic emulsifying agents where at least one emulsifying agent is relatively hydrophobic and at least one emulsifying agent is relatively hydrophilic. A relatively hydrophobic non-ionic emulsifying agent is defined as one having a cloud point in a 1% aqueous solution of between 80° F. and 160° F. A relatively hydrophilic non-ionic emulsifying agent is defined as having a cloud point in a 1% aqueous solution above about 190° F.

Some examples of such combined non-ionic emulsifying agents include a relatively hydrophilic polyoxyethylene nonylphenyl ether, marketed under the trade name Igepal CO–880, and a relatively hydrophobic polyoxyethylene nonylphenyl ether, marketed under the trade name Igepal CO–630; a relatively hydrophobic polyoxyethylene oleyl ether, marketed under the trade name Atlas G–3915, and a relatively hydrophilic polyoxyethylene lauryl ether, marketed under the trade name Brij 35.

The concentrations of ranges of the emulsifying agents which can be used will vary quite widely depending on the particular emulsifying agent or combined emulsifying agents employed. Generally, when using the combined non-ionic emulsifying agents, we have found that it is advantageous to use from between about 0.4% to 4.0% based on the aqueous phase of the emulsion regardless of the solid content.

When using the combined hydrophobic-hydrophilic emulsifying agents, the concentration of the relatively hydrophobic agent with respect to the relatively hydrophilic agent and vice versa can range between about 25 to 75% of the total emulsifier concentration. For example, 25% of a relatively hydrophobic agent and 75% of a relatively hydrophilic agent, or vice versa, can be used.

The freeze-thaw stable vinyl ester polymer emulsions of this invention can be prepared with or without the use of protective colloids. Both the unprotected and protected emulsions are freeze-thaw stable.

Colloids can be used if desired to control or increase the viscosity of the emulsions to obtain emulsions for various uses where different or increased viscosities are desirable. The amount of colloid which can be used is determined by the viscosity desired since the emulsions are stable independently of the colloid. It is desirable, however, to maintain the colloid concentration at the lowest possible level to insure a film with good water and scrub resistance and yet retain the desired viscosity. The amount of colloid used will also depend upon the particular colloid employed. Colloids of high molecular weight tend to produce an emulsion of higher viscosity than like amounts of a lower molecular weight colloid.

Examples of colloids which can be used in forming the freeze-thaw vinyl ester polymer emulsions of this invention include hydroxyethyl cellulose, polyvinyl alcohol, partially acetylated polyvinyl alcohol, hydroxyethyl starch, carboxymethyl cellulose, gum arabic, and the like.

Different catalysts can also be used in carrying out the polymerization of the vinyl esters according to this invention, such as peroxide compounds. The combination type catalysts employing both reducing and oxidizing agents are advantageous. This type of combined catalyst is generally referred to in the art as "redox polymerization" or "redox system." The reducing agent is also often referred to as an activator and the oxidizing agent as an initiator. Suitable reducing agents or activators include bisulfites, sulfoxylates or other sulfoxy compounds having reducing properties such as ferrous salts, and tertiary aromatic amines, e.g., N,N-dimethyl aniline. The oxidizing agents or initiators include hydrogen peroxide, organic peroxides such as benzoyl peroxide, t-butyl hydroperoxide and the like, persulfates, perborates and the like. Specific combination type catalysts or redox systems which can be used include hydrogen peroxide and zinc formaldehyde sulfoxylate; hydrogen peroxide or ammonium, or potassium persulfate with sodium metabisulfite, sodium bisulfite, ferrous sulfate, dimethylaniline, zinc or sodium formaldehyde sulfoxylate. Other types of catalysts that are well-known in the art can also be used to polymerize the vinyl esters according to this invention such as the peroxide compounds with or without the addition of reducing agents or other activating materials.

It is also advantageous to utilize a more oil-soluble hydroperoxide, such as t-butyl hydroperoxide instead of the more water-soluble peroxides, such as hydrogen peroxide in the redox system, to catalyze the vinyl ester polymerization. The use of such slightly oil-soluble catalysts reduces the tendency of clustering, especially at the final stage of conversion. This advantage of the more oil-soluble catalysts is especially apparent when polymerizing unprotected emulsions or emulsions free of protective colloids.

Low temperature filming aids or plasticizers can also be used with the vinyl esters used to form the emulsions of this invention. The particular plasticizer used will, of course, depend upon the vinyl ester being polymerized. Some examples of plasticizers which can be used are diethyl phthalate and hexylene glycol. Other well-known plasticizers can also be used.

Different reaction temperatures can be used to carry out the polymerization reaction of this invention as is well-known in the art. We prefer, however, to use an average or means reaction temperature of about 50° C. in the particular emulsion polymerization process herein described and set forth in the specific examples.

The reaction time will also vary depending upon other variables such as the temperature, the catalyst, the rate of cooling, the particular monomers being polymerized, etc. It is generally advantageous to continue the reaction until the residual monomer content is below 0.5 percent. As pointed out above, however, where the resulting polymer emulsions are to be rendered alkaline, it is advantageous to continue the reaction until the residual monomer content is less than about 0.2 percent in order to prevent pH drift. A reaction time of about five hours has been found to be generally sufficient to complete the polymerization, but reaction times ranging from one to twelve hours have been used.

The viscosity measurements referred to herein were taken on a Brookfield Viscometer, Model LVF with number 3 spindle at 60 r.p.m.

Igepal CO-630 referred to in the following examples is a relatively hydrophobic polyoxyethylene nonylphenyl ether having a cloud point of between about 126–133° F.; Igepal CO-880 is a relatively hydrophilic polyoxyethylene nonylphenyl ether having a cloud point of about 212° F.; Cellosize WP-300 is a hydroxyethyl cellulose having a viscosity of 7000 centipoises in a 4% aqueous solution at 25° C.; and Rongalite CX is a sodium formaldehyde sulfoxylate.

The polymerization reactions in the following examples were carried out in a nitrogen atmosphere in a conventional reaction or resin kettle immersed in a water bath to heat and cool the reaction mixture and fitted with a stirrer, addition apparatus and a reflux condenser. The emulsions were stirred throughout the reaction period by dual propeller blades at between 250 and 300 r.p.m. After the monomer emulsions were placed in the reaction kettle, nitrogen was passed through the stirred emulsion for about one-half hour prior to beginning the reaction.

The resulting emulsions produced in accordance with the specific examples set forth below exhibited no significant changes in their physical properties after being subjected to a freeze-thaw cycle. The freeze-thaw cycle to which the emulsions were subjected consisted of freezing 100 grams of the emulsion contained in 2 oz. screw cap bottles in the freezing compartment of a refrigerator at about −15° C. for sixteen hours and permitting them to thaw at room temperature.

EXAMPLE 1

*Vinyl acetate-dibutyl maleate copolymer emulsion with crotonic acid*

A vinyl acetate monomer emulsion was formed by mixing 125 lbs. of vinyl acetate in 240 lbs. of deionized water together with 2 lbs. 6 ozs. of Igepal CO-880, 2 lbs. 6 ozs. of Igepal CO-630, 10 ozs. of Cellosize W-300, and 12 lbs. of hexylene glycol, and the resulting semi-stable emulsion homogenized. The emulsion was homogenized by continuously circulating it through a two pump homogenization system comprising a gear pump and a centrifical pump at between 100 and 120 p.s.i.g. for thirty minutes to reduce the monomer droplet size below 10 microns.

The homogenized monomer emulsion was then transferred to the reaction kettle and the stirring begun. 350 mls. of t-butyl hydroperoxide were added and stirred into the emulsion. The stirred emulsion was then heated to 50° C. by means of the water bath and the temperature stabilized at this level.

A mutual monomer solution of 85 lbs. of vinyl acetate, 89 lbs. of dibutyl maleate and 1 lb. of crotonic acid was gradually added to the stirred emulsion continuously and at a constant rate over a two and one-half hour period.

5 liters of an activator solution made up of 168 ozs. of water, 20 ozs. of Rongalite CX, and 12 ozs. of sodium acetate trihydrate were also gradually added to the stirred emulsion over a four-hour period. The addition of the activator solution was begun at the same time as the mutual monomer solution. During the delayed addition of the monomers and the activator solution, the reaction temperature was maintained at approximately 50° C. by means of the water bath.

At the end of the four-hour addition period of the activator solution the noticeable exothermic reaction ceased. The reaction product was then maintained at a temperature of 50° C. for an additional hour until the monomer content was below 0.2%.

The vinyl acetate-dibutyl maleate copolymer emulsion was then allowed to cool to 35° C. and neutralized by adding thereto 1 lb. of sodium carbonate in sufficient water to produce a 55% solids emulsion. The reaction product was stirred for five minutes after the addition of the sodium carbonate.

The neutralized emulsion had a pH of 8.2, a viscosity of 480 cps. and a solids content of 55%.

The emulsion exhibited good mechanical stability and aging properties and when subjected to the freeze-thaw cycles it exhibited no significant changes in its physical characteristics and was freeze-thaw stable. The polymer also exhibited a significantly increased pigment-binding capacity when pigments were added thereto.

Films formed from the emulsions on suitable bases were continuous and clear and possessed good adhesion and water resistant properties. Continuous films were also formed from the emulsion at temperatures as low as 40° F.

EXAMPLE 2

*Vinyl acetate-dibutyl maleate copolymer emulsion with vinyl pyrrolidone*

A vinyl acetate-dibutyl maleate comonomer emulsion was formed by 280 grams of vinyl acetate, 120 grams of dibutyl maleate in 170 grams of water together with 6.6 grams of vinyl pyrrolidone, 2.4 grams of Igepal CO-630, 2.4 grams of Igepal CO-880, 2.4 grams of Cellosize WP–300, and 16 grams of hexylene gylcol, and the resulting semi-stable emulsion homogenized by mixing it in a Waring blender unitl the monomer droplet size was below 10 microns.

The homogenized monomer emulsion was then transferred to the reaction kettle and the stirring begun. 0.8 millimeter of t-butyl hydroperoxide was then added to and stirred in the emulsion. The stirred monomer emulsion was then heated to 50° C. by means of the water bath and the temperature stabilized at this level. The monomer emulsion was then held at this temperature for 15 minutes to initiate the reaction.

50 mls. of an activator solution consisting of a 1% solution of Rongalite CX and 0.5% sodium acetate trihydrate were then gradually added to the stirred and heated emulsion at a fairly constant rate over a period of four hours. During the delayed addition of the activator solution, the reaction temperature was maintained at approximately 50° C. by means of the water bath. After all of the activator solution was added, the reaction product was maintained at a temperature of 50° C. for an additional hour until the monomer content was below 0.2%.

The vinyl acetate-dibutyl maleate copolymer emulsion was then cooled to 35° C. and 5 mls. of a 5% solution of sodium bicarbonate added thereto and stirred in.

The emulsion when subjected to the freeze-thaw cycles showed no significant changes in its physical characteristics and was freeze-thaw stable and otherwise exhibited similar properties to the polymer emulsion of Example 1.

EXAMPLE 3

*Vinyl acetate-dibutyl maleate copolymer emulsion with acrylamide*

A vinyl acetate-dibutyl maleate comonomer emulsion was formed by mixing 280 grams of vinyl acetate, 120 grams of dibutyl maleate, 6.6 grams of acrylamide in 312 grams of deionized water together with 2.4 grams of Igepal CO–880, 2.4 grams of Igepal CO–630, 2.4 grams of Cellosize WP–300, and 16 grams of hexylene glycol, and the resulting semi-stable emulsion homogenized by mixing it in a Waring blender until the monomer droplet size was below 10 microns.

The homogenized monomer emulsion was then transferred to the reaction kettle and the stirring begun. 0.75 grams of t-butyl hydroperoxide were then added to and stirred in the emulsion. The temperature of the emulsion was then raised to 50° C. by means of the water bath and the temperature stabilized at this level. The reaction mixture was maintained at this temperature for a period of fifteen minutes to initiate the reaction.

47 mls. of an activator solution consisting of a 1% solution of Rongalite CX and a 0.5% solution of sodium acetate trihydrate were then added to the reaction mixture gradually over a period of six and one-half hours continuously and at a fairly constant rate. During the delayed addition of the activator solution to the reaction mixture, the reaction temperature was maintained at about 50° by means of the water bath. At the end of the six and one-half hour period 0.1 cc. additional t-butyl hydroperoxide was added to the reaction and the reaction maintained at 50° C. for an additional hour until the monomer content was below 0.2%.

The emulsion was subjected to the freeze-thaw test and showed no changes in its physical properties and was freeze-thaw stable. The emulsion was applied to a suitable surface, and formed a clear continuous film possessing good adhesion and water-resistant properties.

EXAMPLE 4

*Vinyl acetate-dibutyl maleate copolymer emulsion with methacrylic acid*

A vinyl acetate-dibutyl maleate comonomer emulsion was formed by mixing 280 grams of vinyl acetate, 120 grams of dibutyl maleate, and 8 grams of methacrylic acid in 307 grams of deionized water together with 2.4 grams of Igepal CO–880, 2.4 grams of Igepal CO–630, 2.4 grams of Cellosize WP–300, and 16 grams of hexylene glycol, and the resulting semi-stable emulsion homogenized in a Waring blender until the monomer droplet size was below 10 microns.

The homogenized monomer emulsion was then transferred to the reaction kettle and the stirring begun. 0.8 gram of t-butyl hydroperoxide were then added to and stirred in the emulsion. The stirred emulsion was then heated to 50° C. by means of the water bath and the temperature stabilized at this level. The reaction mixture was then maintained at this temperature for a period of one hour to initiate the reaction.

An activator solution consisting of a 1% solution of Rongalite CX and a 0.5% solution of sodium acetate trihydrate was then gradually added to the reaction mixture for a period of six and one-half hours continuously and at a fairly constant rate. A total of 50 mls. of the activator solution was gradually added to the reaction mixture during this time.

At the end of the six and one-half hour addition period of the activator solution, the noticeable exothermic action reaction ceased. 0.1 ml. additional t-butyl hydroperoxide was then added to the reaction mixture and the reaction mixture maintained at 50° C. for an additional hour until the monomer content was below 0.2 percent. The reaction product was then cooled to 35° C. and 5 mls. of a 5% solution of sodium bicarbonate added thereto.

The resultant emulsion, when subjected to the freeze-thaw cycles, showed no significant change in its physical properties and was freeze-thaw stable and formed clear continuous films possessing good adhesion and water-resistant properties.

EXAMPLE 5

*Vinyl isobutyrate homopolymer emulsion with methacrylic acid*

A vinyl isobutyrate monomer emulsion was formed by mixing 150 grams of vinyl isobutyrate in 400 grams of deionized water together with 30 grams of a 10% aqueous solution of Igepal CO–630, 30 grams of a 10% aqueous solution of Igepal CO–880, and 40 grams of a 2% aqueous solution of Cellosize WP–300, and the semi-stable emulsion homogenized in a Waring blender until the monomer droplet size was below 10 microns.

The homogenized monomer emulsion was transferred to the reaction kettle and the stirring thereof begun. 1 ml. of t-butyl hydroperoxide initiator was then added to and stirred in the emulsion. The stirred emulsion was then heated to 50° C. by means of the water bath and the temperature stabilized at this level.

A mutual solution of 250 grams of vinyl isobutyrate and 3.5 grams of methacrylic acid was then gradually added to the stirred and heated emulsion at a constant rate over a three hour period. The rate of addition was thus about 1.4 grams per minute.

At the same time as the addition of the mutual solution of the vinyl isobutyrate and methacrylic acid was commenced, the gradual addition of an activator solution consisting of a 2% solution of Rongalite CX and a 1% solution of sodium acetate trihydrate was also begun. The activator solution was added gradually at a fairly constant rate over a four-hour period. A total of 65 mls. of the activator solution were added over this period. During the addition of the mutual monomer solution and the activator solution, the reaction temperature was maintained at approximately 50° C. by means of the water bath.

At the end of the four-hour addition period of the activator solution, 0.8 ml. of additional t-butyl hydroperoxide were then added and the reaction product maintained at 50° C. for an additional one-half hour until the residual monomer content was below 0.2%. The resulting emulsion had a pH of 4.75 and a viscosity of 150 cps.

The polyvinyl isobutyrate emulsion was then cooled to 35° C. and 2.25 grams of sodium carbonate in 10 mls. of water added and stirred in the emulsion. The resulting emulsion had a pH of 9.0 and a viscosity of 200 cps.

The emulsion when subjected to freeze-thaw cycles exhibited no significant changes in its physical characteristics and was freeze-thaw stable. The emulsion also had good mechanical stability and aging properties. Films formed from the emulsion on a suitable base were clear and possessed good adhesion, and scrub and water-spotting resistance.

EXAMPLE 6

*Vinyl acetate homopolymer emulsion with crotonic acid*

A vinyl acetate monomer emulsion was formed by mixing 200 grams of vinyl acetate in 340 grams of deionized water together with 5 grams of Igepal CO-880, 5 grams of Igepal CO-630, 0.8 gram of Cellosize WP-300, and 20 grams of diethyl phthalate, and the semi-stable emulsion homogenized in a Waring blender until the monomer droplet size was below 10 microns.

The homogenized emulsion was then transferred to the resin kettle and the stirring begun. The stirred emulsion was then heated to 50° C. by means of the water bath and the temperature stabilized at this level. 1 ml. of t-butyl hydroperoxide was then added to and stirred in the emulsion to initiate the reaction.

An activator solution consisting of a 2% solution of Rongalite CX and a 1% solution of sodium acetate trihydrate was gradually added to the reaction mixture at the rate of 0.14 ml. per minute.

At the same time as the delayed addition of the activator solution was begun, the gradual addition of a mutual monomer solution of 300 grams of vinyl acetate and 2.5 grams of crotonic acid was also begun at the rate of 2.5 grams per minute. The delayed addition of the mutual monomer solution was continued without interruption over a two-hour period until all of it had been added to the reaction mixture.

The delayed addition of the activator solution was continued at approximately the same rate over a total period of six hours. A total of 50 ml. of activator solution was added to the reaction mixture over this six-hour period. During the addition of the activator solution, the reaction temperature was maintained at approximately 50° C. by means of the water bath.

At the end of the six-hour period 0.1 ml. of additional t-butyl hydroperoxide was added to the reaction and the reaction maintained at 50° C. for an additional hour until the residual monomer content was below 0.2%. The resulting polymer emulsion was neutralized with 2 grams of sodium carbonate in 20 mls. of water. The emulsion has a pH of 8.3 and a viscosity of 440 cps.

The polyvinyl acetate emulsion when subjected to freeze-thaw cycles showed no significant changes in physical characteristics and was freeze-thaw stable. Films formed from the emulsion were clear, and possessed good adhesion and water-resistant properties.

EXAMPLES 7

*Vinyl acetate-vinyl stearate copolymer emulsion with crotonic acid*

A vinyl acetate-vinyl stearate comonomer emulsion was formed by mixing 2250 grams of vinyl acetate and 750 grams of vinyl stearate in 4000 grams of deionized water together with 50 grams of Igepal CO-880, 50 grams of Igepal CO-630, 2.5 grams of Cellosize WP-300, and 200 grams of diethyl phthalate. The resulting semistable emulsion was then homogenized by continuously passing it through a Viking gear pump with 100 p.s.i.g. in the exit line. The exit line was fitted with a 3/16" nozzle and the emulsion impinged on a glass surface 1 to 2 inches from the exit line. Homogenization was complete when the monomer droplet size was below 10 microns.

The homogenized comonomer emulsion was transferred to the reaction kettle and the stirring begun. 10 mls. of t-butyl hydroperoxide were added to and stirred in the emulsion. The stirred emulsion was then heated to 50° C. by means of the water bath and the temperature stabilized at this level.

A mutual solution of 2000 grams of vinyl acetate and 12.5 grams of crotonic acid was then gradually added to the stirred and heated emulsion at a constant rate over a two-hour period. The rate of addition was about 16.8 grams per minute.

At the same time as the addition of the vinyl acetate and crotonic acid solution was initiated, the gradual addition of an activator solution consisting of a 5% solution of Rongalite CX and a 2.5 solution of sodium acetate trihydrate was also begun. The activator solution was added gradually over a six-hour period at a fairly constant rate. A total of 140 mls. of the activator solution were added over the six-hour period. During the addition of the mutual monomer solution and the activator solution, the mean reaction temperature was maintained at approximately 50° C. by means of the water bath.

At the end of the six-hour addition period of the activator solution, 10 mls. of additional t-butyl hydroperoxide were added and the reaction product maintained at 50° C. for an additional hour until the residual monomer content was below 0.2%.

The vinyl acetate-vinyl stearate copolymer emulsion was then cooled to 35° C. and 15 grams of sodium carbonate added together with sufficient water to bring the solids content of the emulsion to 55%. The resulting neutralized emulsion had a pH of 7.8 and a viscosity of 500 cps. and possessed good mechanical stability. The emulsion when subjected to freeze-thaw cycles exhibited no significant changes in its physical characteristic and was freeze-thaw stable. Films formed from the emulsion on suitable bases were clear and exhibited good adhesion, and scrub and water-spotting resistance.

EXAMPLE 8

*Vinyl acetate-vinyl stearate copolymer emulsion with methacrylic acid*

A vinyl acetate-vinyl stearate comonomer emulsion was formed by first forming a mutual solution of 23 lbs. of vinyl acetate, 4.5 lbs. of vinyl stearate, and 1.2 lbs. of diethyl phthalate. The mutual monomer solution was then mixed with an aqueous solution consisting of 0.45 lb. of Iegpal CO-880, 0.45 lb. Iegpal CO-630, and 22.5 lbs. of deionized water to form a semi-stable vinyl acetate-vinyl stearate comonomer emulsion. The semi-stable emulsion was then homogenized in the same manner as the emulsion in Example 7.

The homogenized comonomer emulsion was then charged to the reaction kettle and the stirring begun. The stirred emulsion was then heated to 48° C. by means of the water bath and the temperature stabilized at this level. 45 mls. of t-butyl hydroperoxide were then added to and stirred in the emulsion.

A mutual solution of 2.35 lbs. of vinyl acetate and 0.15 lb. of methacrylic acid was then gradually added to the stirred and heated emulsion at a constant rate over the first two hours of the reaction period. The rate of addition was 1.75 lbs. per hour.

Concurrently with the delayed addition of the mutual monomer solution the gradual addition of 400 mls. of an activator solution containing 10 Rongalite CX and 5% sodium acetate trihydrate was begun. The activator solution was added gradually to the reaction over a four-hour period. The rate of addition of the activator solution was approximately 100 mls. per hour. During the addition of the mutual monomer solution and the activator solution, the mean reaction temperature was maintained at approximately 50° C.

Near the end of the four-hour addition period of the activator solution 5 mls. of additional t-butyl hydroperoxide were added and the reaction product maintained at about 50° C. for an additional hour until the residual monomer content was below 0.2%.

The vinyl acetate-vinyl stearate copolymer emulsion was then cooled to about 35° C. and 0.15 lb. of sodium carbonate were added to the reaction together with sufficient water to bring the solids content of the emulsion to 55 percent.

The resulting emulsion had a solids content of 55 percent, a viscosity of 220 cps. and a pH of 8.2. The emulsion when subjected to the freeze-thaw cycle exhibited no significant changes in its physical characteristics and was freeze-thaw stable. The emulsion also exhibited good mechanical stability and aging. Films formed from the emulsion on suitable bases were clear and had good adhesion and water-resistant properties.

A similar freeze-thaw stable vinyl acetate-vinyl stearate copolymer emulsion can be formed with crotonic acid in place of methacrylic acid and in which case it is advantageous to delay the addition of at least about 40% of the total vinyl acetate instead of about 9.2% as was delayed in the above example with the methacrylic acid.

EXAMPLE 9

*Vinyl acetate-ethyl acrylate copolymer emulsion with methacrylic acid*

0.45 lb. of Igepal CO–880 and 0.45 lb. of Igepal CO–630 were dissolved in 10 lbs. of water at 80° C. and 13.5 lbs. additional water added to the resultant solution. 12.45 lbs. of vinyl acetate and 0.75 lb. of ethyl acrylate were then mixed with the aqueous solution and emulsified therein by rapid stirring. The unstable comonomer emulsion was then homogenized in the same manner as the emulsion in Example 7.

The homogenized monomer emulsion was then transferred to the reaction kettle and the stirring begun. 0.12 lb. of t-butyl hydroperoxide was added to and stirred in the emulsion. The stirred emulsion was then heated to 45° C. and the temperature stabilized at this level.

270 mls. of an aqueous activator solution comprising 10% Rongalite CX and 5% anhydrous sodium acetate were then gradually added to the stirred and heated emulsion over a three-hour period at the rate of 90 mls. per hour.

Concurrently with the addition of the activator solution a mutual monomer solution comprising 1.4 lbs. vinyl acetate, 1.4 lbs. of ethyl acrylate, and 0.15 lb. of methacrylic acid was also gradually added to the heated and stirred emulsion during the first one-half hour of the reaction at a substantially constant rate.

As soon as the initial monomer solution had been added to the reaction mixture, the gradual addition of a second monomer solution comprising 6.85 lbs. of ethyl acrylate, 6.85 lbs. of vinyl acetate, and 0.15 lb. of methacrylic acid was begun. The gradual addition of this second monomer solution was continued at a substantially constant rate over a two and one-half hour period. The mean reaction temperature was maintained at about 50° C. throughout the delayed addition of the two monomer solutions and the activator solution.

After all of the monomer solutions and the activator solution had been added to the reaction at the end of the three-hour reaction period 0.03 lb. additional t-butyl hydroperoxide was added and the reaction maintained at about 50° C. for another 40 minutes until the residual monomer content was below 0.5%. The resulting vinyl acetate-ethyl acrylate copolymer emulsion contained 56% nonvolatile solids, had a pH between 4.5 to 5.0 and a viscosity between 40–60 cps.

The vinyl acetate-ethyl acrylate copolymer emulsion was cooled to 35° C. and 0.15 lb. of sodium carbonate added together with sufficient water to bring the solids content to between 51 and 53%. The resulting polymer emulsion had a pH of 8.8, a viscosity of 850 cps. and good mechanical stability and aging properties. The emulsion when subjected to freeze-thaw cycles showed no significant changes in its physical properties and was freeze-thaw stable. Films formed therefrom on suitable bases were clear and pliable and possessed good adhesion and scrub-resistant properties.

The present application is a continuation-in-part of U.S. application Serial No. 647,207, filed March 20, 1957, now abandoned.

We claim:

1. The method of preparing a freeze-thaw stable aqueous polymeric emulsion which comprises forming an aqueous emulsion containing an emulsified monomeric mixture comprising a monomeric vinyl ester of an aliphatic carboxylic acid and a mono-ethylenically unsaturated carboxylic acid, substantially completely copolymerizing said monomer mixture in the presence of an emulsion polymerization initiator, the mono-ethylenically unsaturated carboxylic acid comprising from about 0.1 to about 2% of the total weight of monomers polymerized, continuing the copolymerization until the residual monomer content is below about 0.5%, and adding an alkali to the polymer emulsion in excess of the amount required to neutralize the emulsion to provide a pH of at least about 7.8.

2. The method of preparing a freeze-thaw stable aqueous polymeric emulsion which comprises forming an aqueous emulsion containing an emulsified monomeric mixture of a vinyl ester of an aliphatic carboxylic acid containing from 1 to about 20 carbon atoms, an ester comonomer selected from the group consisting of (a) vinyl esters of carboxylic acids containing up to about 20 carbon atoms and having a molecular weight greater than the molecular weight of said first mentioned vinyl ester of a carboxylic acid and (b) dialkyl esters of α,β-dicarboxylic acids, and a mono-ethylenically unsaturated carboxylic acid, substantially completely copolymerizing said monomers in the presence of an emulsion polymerization initiator, the mono-ethylenically unsaturated carboxylic acid comprising from about 0.1 to about 2% of the total weight of monomers polymerized, continuing the copolymerization until the residual monomer content is below about 0.5%, and adding an alkali to the polymer emulsion in excess of the amount required to neutralize the emulsion to provide a pH of at least about 7.8.

3. The method of preparing a freeze-thaw stable aqueous polymeric emulsion which comprises forming an aqueous emulsion containing an emulsified monomeric mixture of vinyl acetate, dibutyl maleate, and a mono-ethylenically unsaturated carboxylic acid, said mixture containing from about 0.1 to about 2% mono-ethylenically unsaturated carboxylic acid based on the total monomer weight, said mixture containing vinyl acetate and dibutyl maleate in a weight ratio in the range of 95:5 to 60:40 parts vinyl acetate to parts dibutyl maleate, substantially completely copolymerizing the said monomers in the presence of an emulsion polymerization initiator, continuing the copolymerization until the residual monomer content is below about 0.5%, and adding an alkali to the polymer emulsion in excess of the amount required to neutralize the emulsion to provide a pH of at least about 7.8.

4. The method of forming a freeze-thaw stable aqueous polymeric emulsion which comprises forming an aqueous emulsion containing an emulsified monomeric mixture of vinyl acetate and vinyl stearate, initiating polymerization of the emulsified monomeric mixture by adding thereto an emulsion polymerization initiator and activator, gradually adding to the emulsion during the polymerization a monomeric mixture of vinyl acetate and a mono-ethylenically unsaturated carboxylic acid, substantially completely copolymerizing the said monomers, the mono-ethylenically unsaturated carboxylic acid comprising from about 0.1 to about 2% of the total weight of monomers polymerized and adding an alkali to the polymer emulsion in excess of the amount required to neutralize the said emulsion.

5. The method of forming a freeze-thaw stable aqueous polymeric emulsion which comprises forming an aqueous emulsion containing an emulsified monomeric mixture of vinyl acetate and ethyl acrylate, initiating polymerization of the emulsified monomeric mixture by adding thereto an emulsion polymerization initiator and activator, gradually adding to the emulsion a monomeric mixture of vinyl acetate, ethyl acrylate and a mono-ethylenically unsaturated carboxylic acid during the polymerization, substantially completely copolymerizing the said monomers, the mono-ethylenically unsaturated carboxylic acid comprising from about 0.1 to about 2% of the total weight of monomers polymerized, the ratio by weight of vinyl acetate to ethyl acrylate of the polymerized monomers being in the range of 95:5 to 60:40 parts vinyl acetate to ethyl acrylate, continuing the copolymerization until the residual monomer content is below about 0.5%, and adding an alkali to the polymer emulsion in excess of the amount required to neutralize said emulsion to provide a pH of at least about 7.8.

6. The method of preparing a freeze-thaw stable aqueous polymeric emulsion which comprises forming an aqueous emulsion containing an emulsified monomeric mixture of vinyl acetate, dibutyl maleate, and crotonic acid, said mixture containing about 0.2 to 0.6% crotonic acid based on the total monomer weight, said mixture containing vinyl acetate and dibutyl maleate in a weight ratio in the range of 95:5 to 60:40 parts vinyl acetate to parts dibutyl maleate, substantially completely copolymerizing the said monomers in the presence of an emulsion polymerization initiator, and adding sodium carbonate to the polymer emulsion in excess of the amount required to neutralize the emulsion.

7. The method of forming a freeze-thaw stable aqueous polymer emulsion which comprises forming an aqueous emulsion containing emulsified monomeric vinyl acetate, initiating polymerization of the monomeric vinyl acetate by adding to the emulsion an emulsion polymerization initiator and activator, gradually adding to the emulsion a monomeric mixture of vinyl acetate and crotonic acid during the polymerization, substantially completely copolymerizing the said monomers, the crotonic acid comprising about 0.5% of the total weight of monomers polymerized, and adding sodium carbonate to the polymer emulsion in excess of the amount required to neutralize the said emulsion.

8. The freeze-thaw stable aqueous polymeric emulsion prepared by the method of claim 3.

9. The freeze-thaw stable aqueous polymeric emulsion prepared by the method of claim 5.

References Cited by the Examiner

UNITED STATES PATENTS

| | | | |
|---|---|---|---|
| 2,263,598 | 11/1941 | Starck et al. | 260—29.6 |
| 2,317,725 | 4/1943 | Billig | 260—29.6 |
| 2,676,938 | 4/1943 | Clark | 260—29.6 |
| 2,763,633 | 9/1956 | Gray | 260—85.7 |
| 2,795,573 | 6/1957 | Barrett et al. | 260—85.7 |
| 3,003,987 | 10/1961 | Hager et al. | 260—29.6 |

WILLIAM H. SHORT, *Primary Examiner.*

D. ARNOLD, LEON J. BERCOVITZ, *Examiners.*